United States Patent [19]

Honjo et al.

[11] Patent Number: 4,695,900
[45] Date of Patent: Sep. 22, 1987

[54] MAGNETIC RECORDING AND PLAYBACK APPARATUS FOR TELETEXT SIGNALS

[75] Inventors: Masahiro Honjo, Neyagawa; Akio Hashima, Tuzuki, both of Japan

[73] Assignee: Matsushita Electric Industrial Co., Ltd., Kadoma, Japan

[21] Appl. No.: 722,452

[22] Filed: Apr. 12, 1985

[30] Foreign Application Priority Data

Apr. 12, 1984 [JP] Japan .................................. 59-73231
Apr. 13, 1984 [JP] Japan .................................. 59-75529
Nov. 20, 1984 [JP] Japan .................................. 59-245128

[51] Int. Cl.$^4$ .............................................. H04N 9/79
[52] U.S. Cl. ...................................... 358/310; 358/327
[58] Field of Search ............... 358/310, 330, 335, 147, 358/145, 15, 21 R, 327; 360/33.1

[56] References Cited

U.S. PATENT DOCUMENTS 4,479,150 10/1984 Ilmer et al. ........................... 358/310
4,532,540 7/1985 Wine .................................. 358/21 R Primary Examiner—Donald McElheny, Jr.
Attorney, Agent, or Firm—Wenderoth, Lind & Ponack

[57] ABSTRACT

A magnetic recording and playback apparatus for teletext signals which accurately records and reproduces the teletext signal superposed within the vertical blanking period of television signal, includes at least one wide band filter, at least one narrow band filter, a filter selection switch which switches at least one filter for a luminance signal processing system to the wide band filter and at least one filter for a chrominance signal processing system to the narrow band filter, and a control circuit which generates a control signal for controlling the filter selection switch. The control circuit generates the control signal only during a specified period where the teletext signal is superposed. In case a comb filter is used, a switch is provided for selectively passing an output of the comb filter and an input video signal to the succeeding stages and a control circuit for producing a control signal to allow the input video signal to pass during a specified period where the teletext signal is superposed.

10 Claims, 24 Drawing Figures

MAGNETIC RECORDING AND PLAYBACK APPARATUS FOR TELETEXT SIGNALS

BACKGROUND OF THE INVENTION

1. Field of the Invention

The present invention relates to a magnetic recording and playback apparatus which records and reproduces text, graphics and other signals superposed in the vertical blanking period of a television signal (hereinafter, these signals will be referred to as the so-called "teletext" signals).

2. Description of Prior Arts

Various recording and playback systems have been proposed for home video tape recorders (hereinafter referred to as VTR's) and the majority of them use the carrier chrominance signal low-frequency band conversion recording system (M system). In this system, a composite video signal is separated into a luminance signal (hereinafter referred to as a Y signal) and a chrominance signal (hereinafter referred to as a C signal). The Y signal is converted to a corresponding FM signal of the Y signal (hereinafter referred to as FM-Y) by frequency modulation, while the C signal is converted to a low-frequency chrominance signal (hereinafter referred to as $C_{LOW}$) by frequency conversion. These FM-Y and $C_{LOW}$ signals are mixed and recorded on a video tape, and reproduced by the inverse process.

In this M system, the recording and reproduction of the high frequency component of the Y signal suffers various restrictions. Here, FIGS. 12(a)–(g) are used for explanation. FIGS. 12(a)–(g) show a schematic diagram of the video signal spectrum during recording and reproduction. A composite video signal (FIG. 12(a)) including a Y signal band of 4.2 MHz and a C signal carrier of 3.58 MHz is separated into the Y signal (FIG. 12(b)) and the C signal (FIG. 12(c)) by a low-pass filter (hereinafter referred to as an LPF) and a band-pass filter (hereinafter referred to as a BPF). In this case, the frequency band of the Y signal is limited to $y_{1b}$ from $y_{1a}$ as indicated by the arrow mark. Thereafter, the Y signal is converted to FM-Y (FIG. 12(d)) by frequency modulation, and the C signal converted to $C_{LOW}$ (FIG. 12(e)) by low-frequency conversion, and these signals are combined. At this time, the FM-Y signal is sent to the high-pass filter (hereinafter referred to as an HPF) and $C_{LOW}$ is sent to the LPF and thereafter these are mixed in order to separate the frequencies of FM-Y and $C_{LOW}$. From FIGS. 12(a)–(g), it is understood that the band-width of the Y signal is limited again to $y_{1f}$ when the signal FM-Y passes through the HPF. The recording signal (FIG. 12(f)) thus modulated is recorded on a magnetic tape and thereafter it is reproduced (FIG. 12(g)). It is also obvious that the band-width $y_{1g}$ of the reproduced Y signal is $y_{1f}$ in maximum. Namely, the input composite video signal has the band-width $y_{1a}$ as the Y signal but such a band width is limited to $y_{1g}$ in maximum when such a signal is recorded and reproduced. In the current home VTR, the recording and playback band-width is about 2 MHz. The band-width of the Y signal can be expanded (corresponding to $y_{1b}$ of FIG. 12(b)) after separation by using a comb filter for separating the Y signal and C signal but the band-width is restricted by the HPF after frequency modulation and currently the recording and playback band-width is 2.5 MHz in maximum in the frequency allocation of a home VTR.

Meanwhile, methods of obtaining a high quality reproduced picture utilizing a metal tape as the recording medium are being investigated. Namely, recording and playback with a metal tape have remarkably increased playback output and an improved S/N as compared with an existing tape and moreover the carrier frequency in the higher frequency band of FM-Y allows expansion of the recording and playback frequency band of the luminance signal.

Such a high quality VTR is capable of recording and reproducing a signal, for example, of 3 MHz bandwidth.

Meanwhile, the teletext system is now investigated for practical use. In the teletext system, characters or figures are disassembled and these are superposed on the vertical blanking period of the video signal of a TV broadcasting signal and they are selectively received by a home television receiver and displayed on it. For example, the transmitting signal is transmitted, for example, in the format of 5.727272 M-bit/sec in the character transmission. Namely, the signal band-width of 2.86 MHz must be acquired in order to record and reproduce such a signal.

For the home VTR with the carrier frequency of 3.4 MHz~4.4 MHz, it has been impossible to record and reproduce the signal of 2.86 MHz but the recording and playback of the teletext signal of 2.86 MHz is considered to be possible because a high quality VTR using a metal tape has a recording and reproducing band-width of 3 MHz or more. However, actually, recording and playback is very difficult because the teletext signal must be reproduced with very good amplitude and group delay characteristics.

However, in the above VTR, a luminance signal passes various filters in the recording and reproduction processes and therefore it has been difficult to make flat the amplitude characteristic of 2.86 MHz and group delay characteristic while the desired cut-off characteristic is maintained. Moreover, a filter having the desired frequency characteristic and flat group delay characteristic is complicated in structure and is expensive and it is not adequate for use in the home VTR because the home VTR also uses many filters. In addition, it is not adequate to only expand the frequency bandwidth of the Y signal because the S/N is deteriorated and noise also increases due to migration of the color signal.

It is also considered difficult to record and reproduce the teletext signal in that a high frequency band is allocated to the luminance signal by separating the video signal into the Y signal and the C signal by the comb filter.

In the above VTR, the teletext signal having no H correlation is reduced by as much as about 6 dB by the comb filter used for separation of the Y and C signals and moreover the group delay characteristic is also disturbed. Thereby, satisfactory recording cannot be done on the tape.

Even in a high quality VTR mentioned above, it is difficult to record the signal of about 3 MHz with flat amplitude characteristic and phase characteristic and particularly the amplitude characteristic is somewhat deteriorated. It can easily be thought that the gain of frequency characteristic in the higher frequency band is raised in order to compensate for deterioration of the amplitude characteristic but it results in a deterioration of the S/N of reproduced video signal.

The Japanese Patent Application No. 57-106909 (Yasuoka et al) discloses a concept that the recording and playback band of the luminance signal is expanded and the character signal is recorded or reproduced by recording or reproducing only the luminance signal without recording and reproducing the color signal in the duration where the character signal is superposed. However, according to this method, a problem arises in that continuity of color signal is lost because the color signal is not recorded and reproduced.

SUMMARY OF THE INVENTION

It is an object of the present invention to provide a magnetic recording and playback apparatus which is capable of recording and reproducing the teletext signal superposed on the television signal with excellent amplitude and group delay characteristic while the continuity of color signal is maintained.

It is another object of the present invention to provide a magnetic recording and playback apparatus which is capable of recording and reproducing the teletext signal without deteriorating the S/N of the video signal.

The teletext signal can be recorded and reproduced with excellent amplitude and group delay characteristics through such a constitution that a filter for the luminance signal is changed to a filter having the characteristic allowing a wider band-width to pass, while a filter for the chrominance signal is changed to a filter having the characteristic allowing a narrower band-width to pass in a specified duration where a teletext signal is superposed on the television signal.

Moreover, in the magnetic recording and playback apparatus so constituted that the luminance signal and the chrominance signal are separated by a comb filter, a teletext signal having no H correlation can be recorded with any attenuation through such a structure in that the luminance signal is not allowed to pass through the comb filter in a specified duration where a teletext signal is superposed.

In the reproducing side, the teletext signal can be recorded and reproduced without deterioration of the S/N of the video signal by improving the high frequency characteristic and phase characteristic of the reproduced luminance signal in a specified duration where a teletext signal is superposed.

The S/N of the color burst in the vertical blanking period is not deteriorated at all during reproduction while the continuity of the chrominance signal is maintained by eliminating the color burst within a specified number of horizontal synchronization periods after the vertical synchronization signals in the specified period.

Basically, the magnetic recording and playback apparatus of the present invention comprises: at least one filter which limits the pass-band in the luminance signal processing system; at least a wide-band filter having a wider pass-band than that of the filter of said luminance signal processing system; at least one filter which limits the pass-band in the chrominance signal processing system; a narrow band-pass filter having a narrower pass-band than that of the filter of said chrominance signal processing system; a filter selection means which changes over said filter of the luminance signal processing system and said wide band filter and said filter of the chrominance signal processing system and said narrow band filter; and a control means which operates said filter selection means during a specified period where a teletext signal is superposed in the television signal and controls it so that changes over the filter of the luminance signal processing system to said wide band filter and the filter of chrominance signal processing system to said narrow band filter.

In case a comb filter is used as the filter which separates and extracts the luminance signal from the input video signal, the magnetic recording and playback apparatus of the present invention comprises: a selection means for selecting an output of comb filter and and input video signal: and a control means which selects the input video signal and extracts it as the luminance signal by operating said selection means during a specified duration where a teletext signal is superposed.

More desirably, the magnetic recording and playback apparatus has, in the reproduction side, a frequency compensation circuit, a phase compensation circuit and a control circuit which operates at least one of said frequency compensation circuit and phase compensation circuit in a duration where a teletext signal is superposed and compensates at least one of the frequency characteristic and the phase characteristic of reproduced luminance signal.

The objects described above and other objects and features of the invention will be well understood from explanation of several preferred embodiments described in detail by referring to the accompanying drawings in which:

DESCRIPTION OF THE PREFERRED EMBODIMENTS

Figure 1:
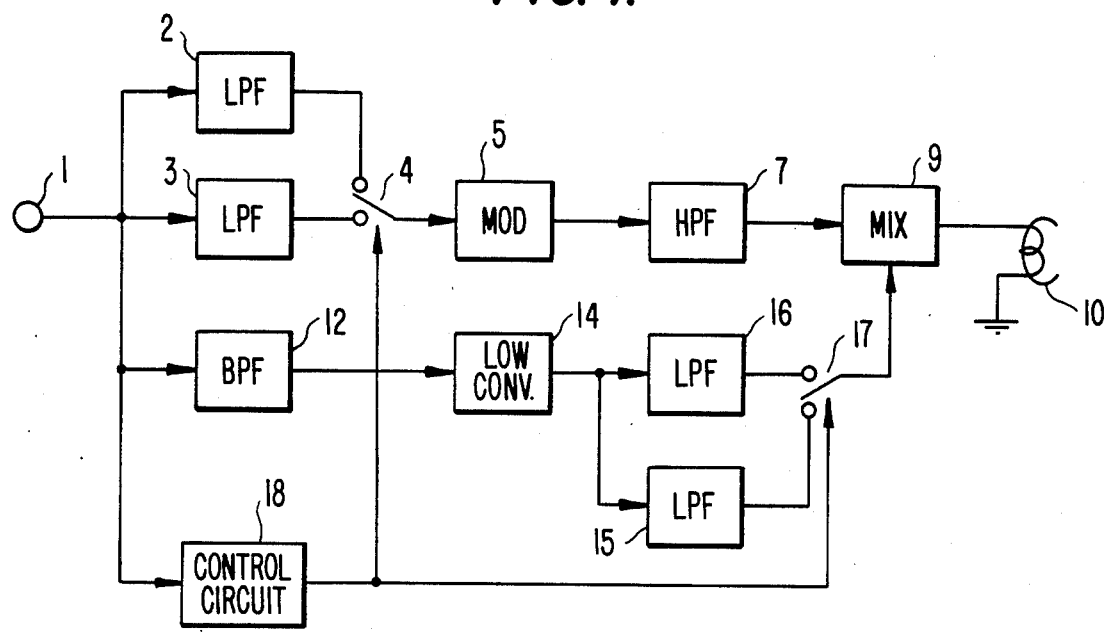
FIG. 1 is a block diagram of an embodiment of the recording system of a magnetic recording and playback apparatus of the present invention.

The embodiments of the present invention will now be explained by referring to the drawings.

FIG. 1 is a block diagram of the recording signal processing system of a VTR by the present invention. In an ordinary operation, an input video signal is inputted from an input terminal (1). The Y signal passes a low-pass filter (LPF) (3) and a switch (4) and is modulated to FM-Y by a frequency modulator (MOD). Thereafter, this FM-Y signal is mixed with $C_{LOW}$ through a high-pass filter (HPF) (7) and a mixer (MIX) (9) and is then recorded on a tape through a recording head (10). Meanwhile, the C signal is converted to a low-frequency signal $C_{LOW}$, for example, of 629 kHz through a band-pass filter (BPF) (12), a low frequency converter (LOW CONV) (14) and is then mixed with the FM-Y signal in the MIX (9) through the LPF (16) and the switch (17).

In the present invention, the Y signal filter is switched and simultaneously the C signal filter is also switched in order to accurately record and reproduce the teletext signal in a specified duration in the vertical blanking period, and the band-width of Y signal can be thereby expanded, simultaneously, noise from the C signal to the Y signal can also be reduced and S/N of the Y signal can be improved.

In the recording system of FIG. 1, LPF (3) is switched to LPF (2), and LPF (16) to LPF (15), respectively. Here, the switches (4), (17) operate according to the signal sent from the control circuit (18). As a result, the frequency characteristic, group delay characteristic and S/N of the Y signal during recording and reproduction can be improved in the duration where the teletext signal in the vertical blanking period is included, as compared with those in the other period.

Figure 2A:
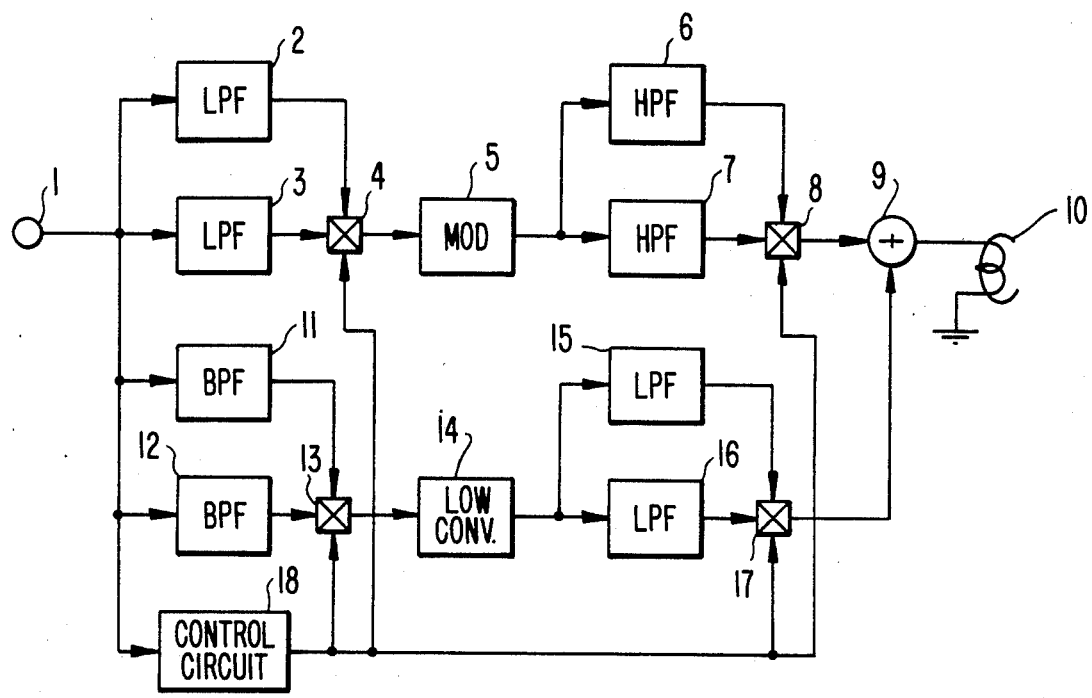
FIGS. 2(A) and (B) are block diagrams of a recording system and a playback system of another embodiment of a magnetic recording and reproduction apparatus of the present invention.
Figure 2B:
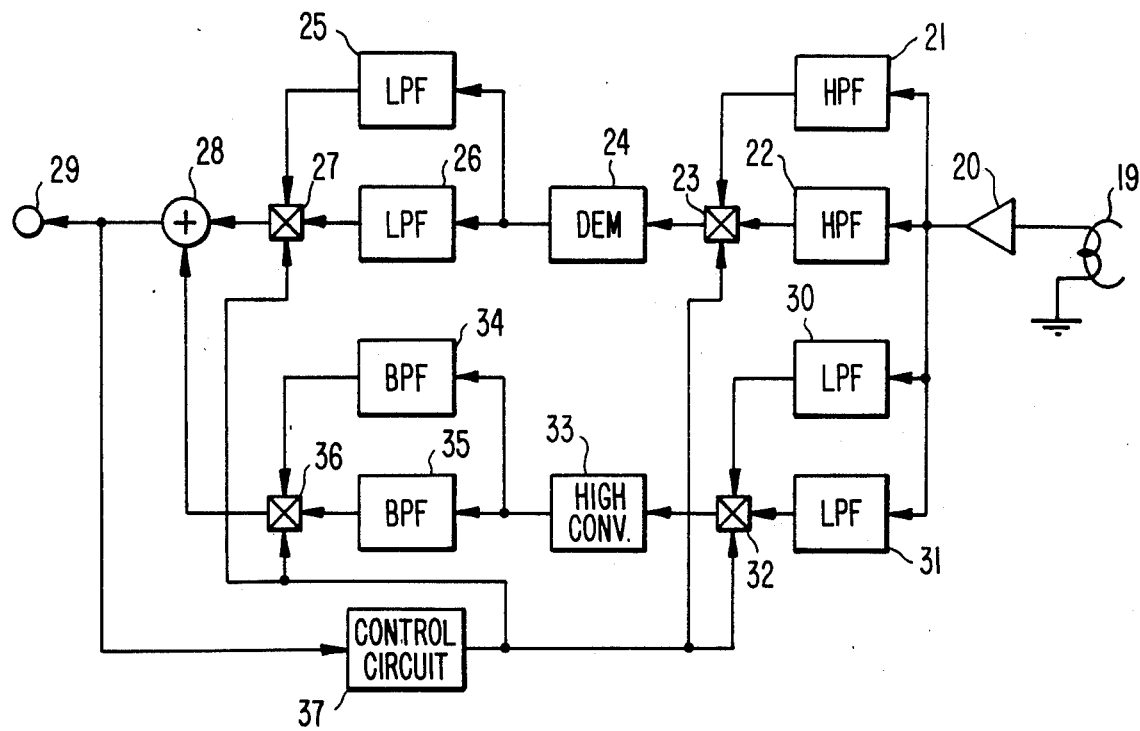

FIGS. 2(A)–(B) are block diagrams showing another embodiment of signal processing system of VTR of the present invention. FIG. 2(A) is a recording system and FIG. 2(B) is a playback system. In an ordinary operation, an input video signal is inputted from an input terminal (1). The Y signal passes a LPF (3) and a switch (4) and is converted to FM-Y by modulation in the MOD (5). Thereafter this signal passes a HPF (7) and a switch (8) and is then mixed with $C_{LOW}$ in the MIX (9) and finally recorded on a tape through a recording head (10). Meanwhile, the C signal passes a BPF (12) and a switch (13) and is converted to a low frequency signal $C_{LOW}$, for example, of 629 kHz by the LOW CONV (14). Thereafter, such a low-frequency signal passes the LPF (16) and the switch (17) and is mixed with the FM-Y signal. In the playback operation, the signal flows inversely. Briefly, a signal detected by the playback head (19) is amplified by a playback amplifier (20). The Y signal passes the HPF (22), switch (23), frequency modulator (DEM) (24), LPF (26), switch (27) and a mixer (28) and is then outputted at the output terminal (29). Meanwhile, the C signal passes the LPF (31), switch (32), high frequency converter (HIGH CONV) (33), BPF (25) and switch (36) and is then mixed with the Y signal in the mixer (28). In the present invention, the Y signal filter is switched and simultaneously the C signal filter is also switched in order to accurately record and reproduce the teletext signal in a specified duration of the vertical blanking period. The bandwidth of Y signal can thereby be expanded, and the noise of C signal into the Y signal can be reproduced and the S/N of the Y signal can also be improved.

Figure 3A:
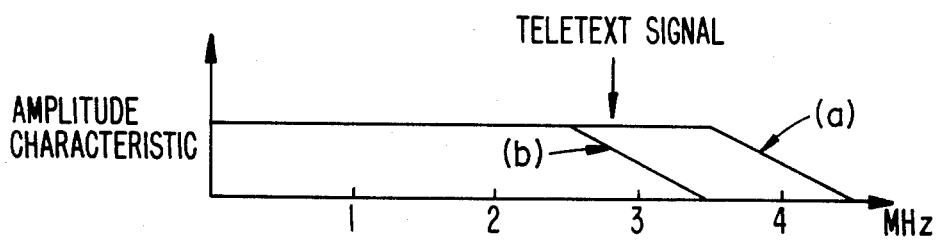
FIGS. 3(A) and (B) are frequency characteristics indicating the amplitude characteristic and group delay characteristic of a reproduced signal obtained by a magnetic recording and playback apparatus of the present invention.
Figure 3B:
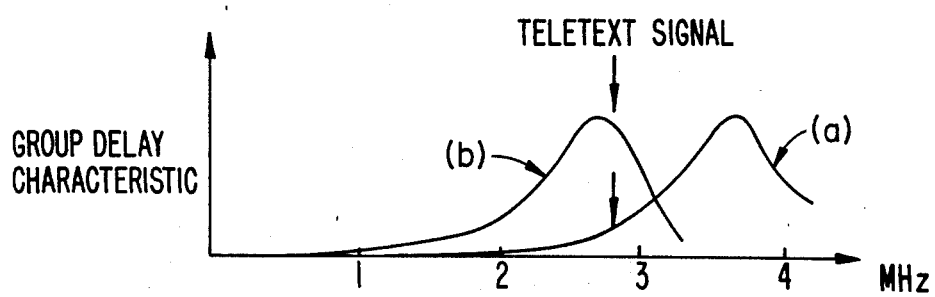

In the recording system of FIG. 2(A), the LPF (3) is switched to LPF (2), HPF (7) to HPF (6), BPF (12) to BPF (11), LPF (16) to LPF (15), respectively. In the playback system of FIG. 2(B) HPF (22) is switched to HPF (21), LPF (26) to LPF (25), LPF (31) to LPF (30), BPF (35) to BPF (34). The switches (4), (8), (13), (17) operate according to the signal sent from the control circuit (18), and the switches (23), (27), (32), (36) operate according to the signal sent from the control circuit (37). As a result, the frequency characteristic, group delay characteristic and S/N during recording and playback of the Y signal are dispersed in the duration where the teletext signal is included in the vertical blanking period, as compared with those in the other periods. This process is shown in FIGS. 3(A) and (B). The curve (a) indicates the characteristic of the present invention, while the curve (b) indicates the characteristic of the prior art. It is apparent from this figure that the frequency characteristic and the group delay characteristic at the frequency of the teletext signal are improved.

The band-width of Y signal can be expanded as explained above because there is no other C signal component than the color burst in the specified duration and it is unnecessary to provide the frequency band for the C signal. The wider the frequency band, the more the group delay characteristic becomes flat at 2.86 MHz.

Figure 4:
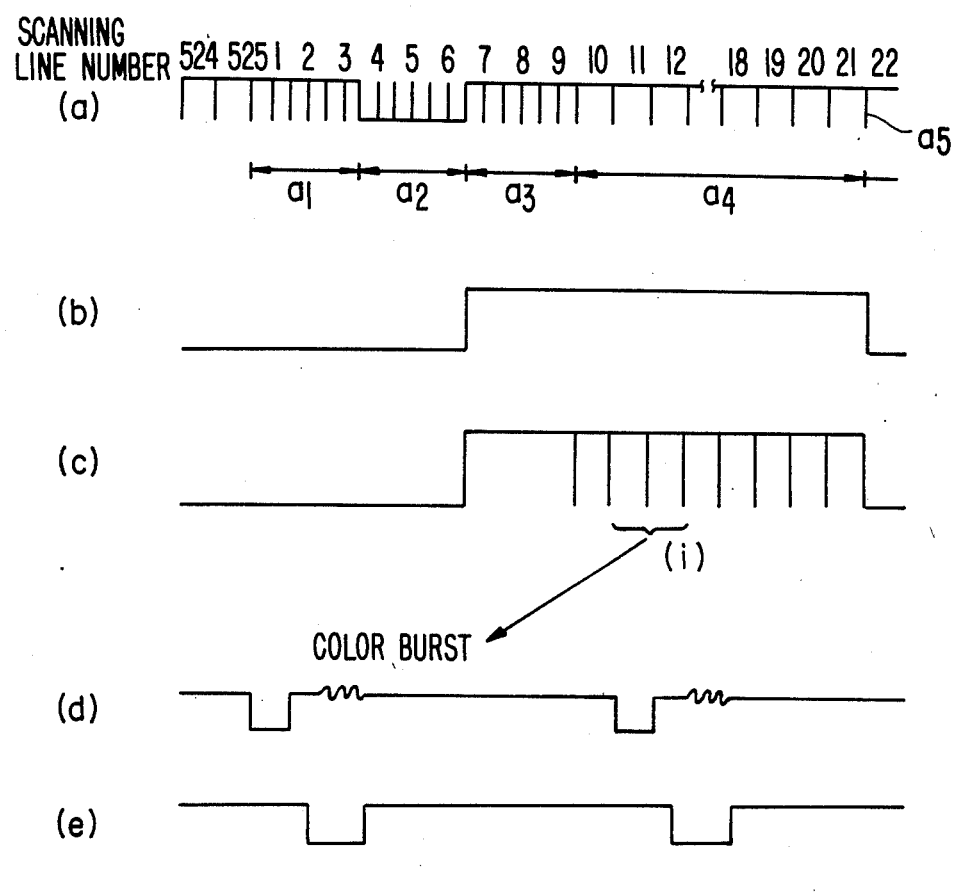
FIGS. 4(a)–(e) are timing charts of signals for explaining the filter selection control in the present invention.

As shown in FIG. 4(a), since the teletext signal is superposed on the arbitrary one or two scanning lines between the scanning number 10H and 21H in the vertical blanking period, it is enough to output a signal durating this range of period as the control signal from the control circuit. Here, $a_1$ and $a_3$ in FIG. 4(a) are equivalent pulse periods, $a_2$ is a vertical synchronization period, $a_4$ is a teletext signal region, and $a_5$ is a horizontal synchronization signal. The numerals indicate the scanning line number.

An example of control signal is shown in FIG. 4(b). FIG. 4(b) shows that the switch is changed over during about 14H after the detection of vertical synchronization signal. When the control signal of FIG. 4(b) is at a low level, the switch selects an ordinary filter and when the control signal is at a high level, the filter is changed.

However, the signal not attenuated by the LPF (2), HPF (6), HPF (21), LPF (25) of FIGS. 2(A)–(B) among the color burst in this duration is recorded and reproduced as the Y signal. Therefore, such a signal appears as the noise of the reproduced color burst of the C signal system. Namely, such a signal is undesirable. Thus, it is also possible to allow the control signal to become a high level in the duration other than the color burst and the control signal. This case is shown in FIG. 4(c). The waveforms FIGS. 4(b) and (c) in the period of FIG. 4(a) are enlarged in FIGS. 4(d) and (e).

Various kinds of control signals are indicated as FIG. 4(b) and (c), but the signal which changes filters in the duration where the teletext signal exists can be used and it is thought most simple to use the vertical synchronization signal. The present invention covers, of course, the operation that the teletext signal is detected and the control signal is generated in accordance with such data.

Various kinds of noise reduction circuits (referred to as NR circuits) are used for the playback system of the home VTR. An example of NR circuit is shown in the block diagram of FIG. 5. The Y signal outputted from the switch (27) is sent to a subtraction circuit (46) and also to the HPFs (40) and (41). In the ordinary playback operation, the signal passes HPF (41), switch (42), limiter (LIM) (43) and gain adjusting circuit (GAIN) (44) and is sent to the subtraction circuit (46). A high frequency low level signal includes a lower noise component as a result of the subtraction and is sent to the mixer (28) and is mixed with the color signal. Thereafter, the mixed signal is output to the output terminal (29). Here, it is desirable to change the characteristic of HPF (41) being used in the NR circuit (45) to the more adequate characteristic as much as the expansion of band-width of the Y signal. Therefore, HPF (41) is changed to HPF (40) by switch (42). Almost the same effect can also be obtained by changing the characteristic of GAIN (44) in place of selecting the HPF. As shown in FIG. 2(B), the control signal is sent to switches (27) and (42) of FIG. 5 from the control circuit (37).

Figure 6:
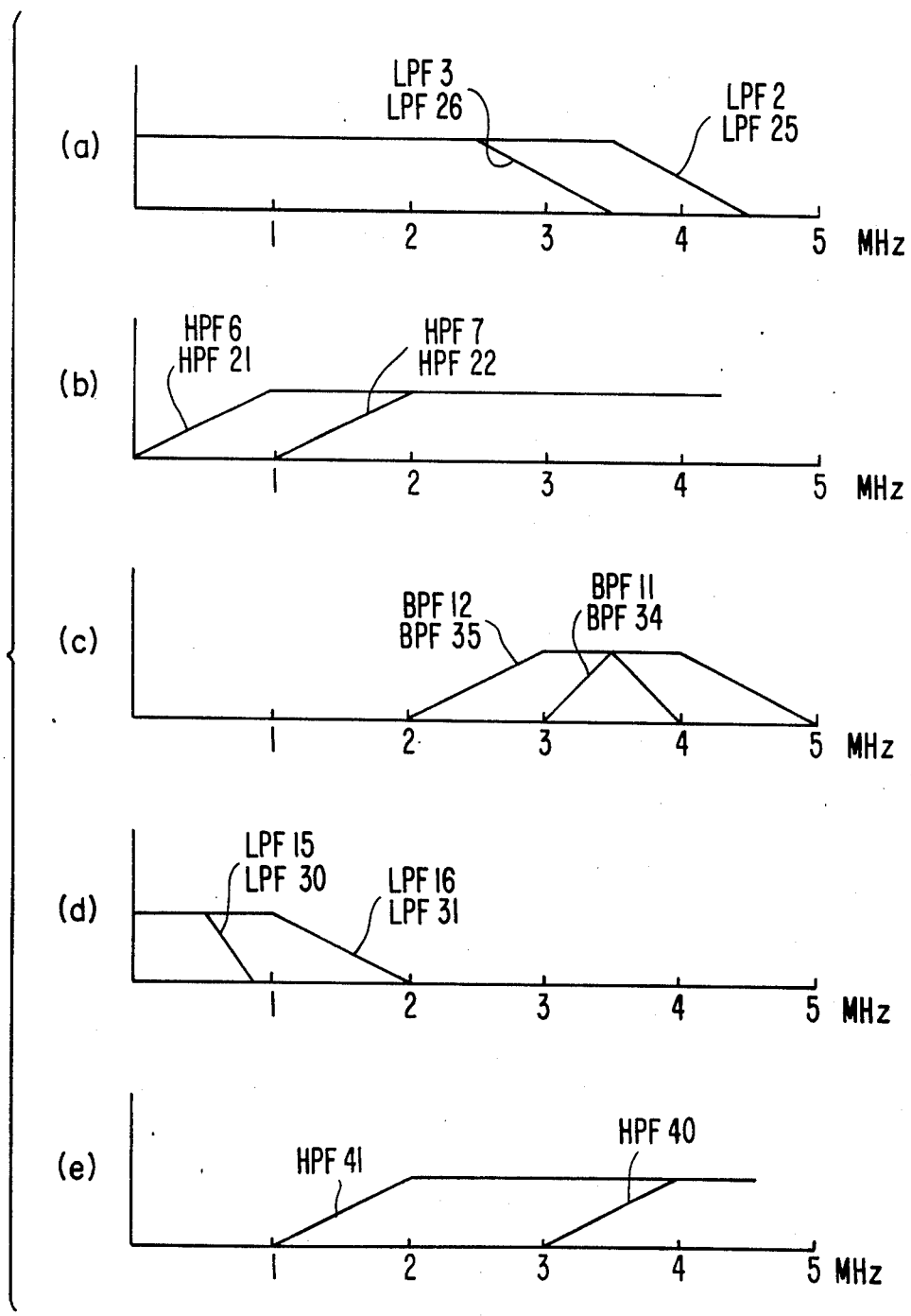
FIGS. 6(a)–(e) show the characteristics of a filter used in respective embodiments of the present invention.

Here, the amplitude characteristics of filters described in above embodiments are shown FIG. 6 for the reference.

In the present invention, it is unnecessary to switch all of the filters and it is enough to change a part of filter. Characteristics of filters are not limited only to FIG. 6. For example, LPFs (2), (25), HPFs (6), (21) may be through circuits and BPFs (11), (34), LPFs (15), (30), HPFs (40) may be OFF.

Figure 7A:
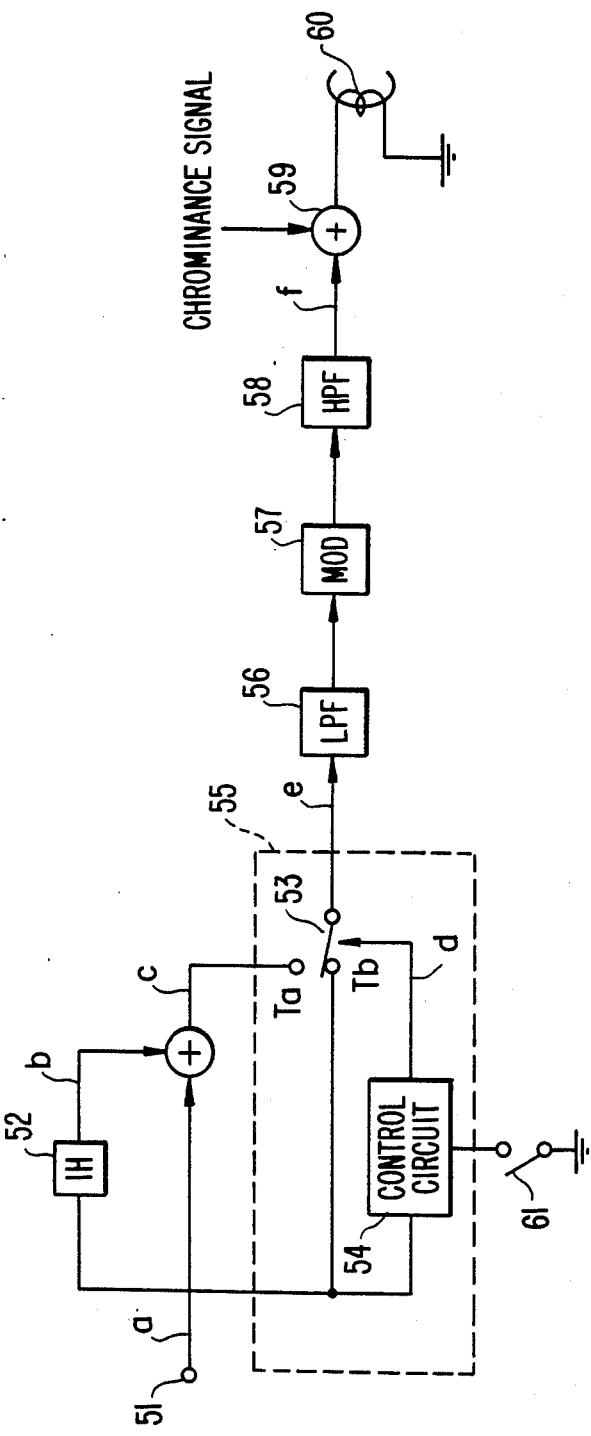
FIGS. 7(A) and (B) are block diagrams of a recording system and a playback system of another embodiment of a magnetic recording and playback apparatus of the present invention.
Figure 7B:
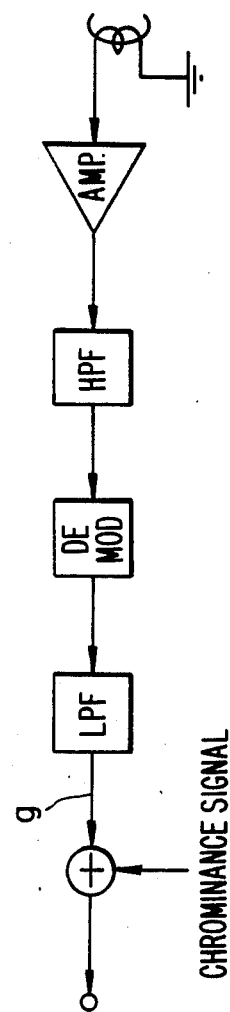

Another embodiment of the present invention will be explained by referring to the drawings. FIGS. 7(A)–(B) block diagrams of a luminance signal processing circuit of VTR of the present invention. In FIG. 7(A), a video signal inputted from an input terminal (51) is delayed for one horizontal scanning period (hereinafter referred to as 1H) by an delay element (52) to be a delayed signal b. This delayed signal b is mixed with the input signal a and is then sent to the terminal (Ta) of an switch (53) as the luminance signal C. On the other hand, the video signal a is directly sent to the other terminal (Tb) of the switch (53) and is also sent to the control circuit (54). The control circuit (54) removes the synchronous signal from the video signal and generates the control signal d for controlling the operation of the switch (53) in accordance with such data. The circuit block (55) is the main circuit block of the present invention. The luminance signal switched by the switch (53) passes the same system as in the case of the signal processing in an ordinary VTR. Namely, the signal passes LPF (56), then frequency modulated by the modulator (57), passes HPF (58), and is then mixed with the color signal in the mixer (59) and finally recorded through the recording head (60). For the playback, the signal is processed almost inversely. An explanation is omitted here because it is already known to those skilled in the art.

Figure 8A:
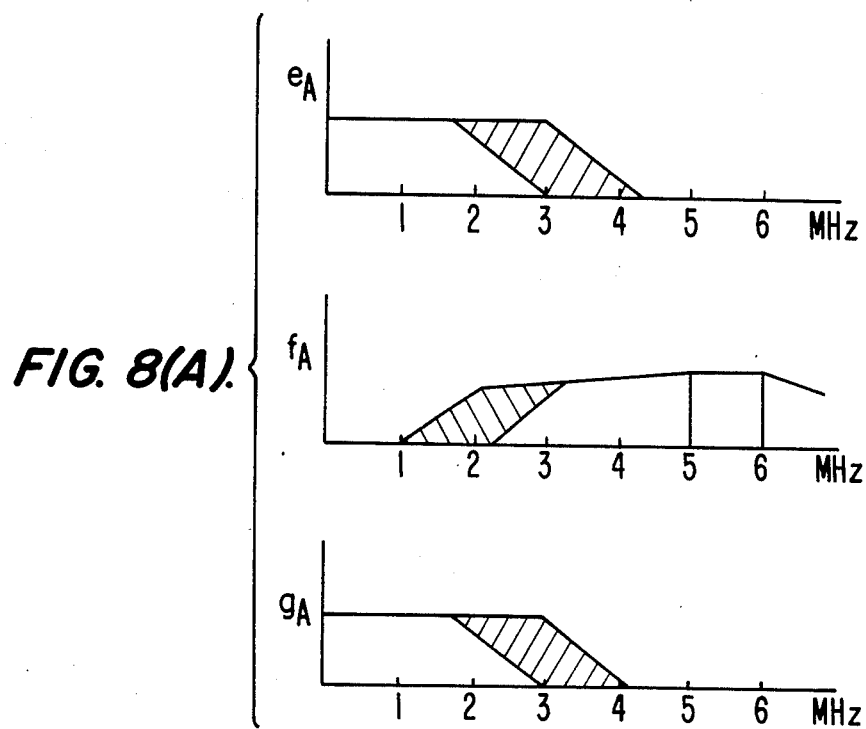
FIGS. 8(A)-(B), FIGS. 9(A)–(C) and FIGS. 11(a)–(d) are signal frequency characteristics and signal waveforms for explaining the present invention.
Figure 8B:
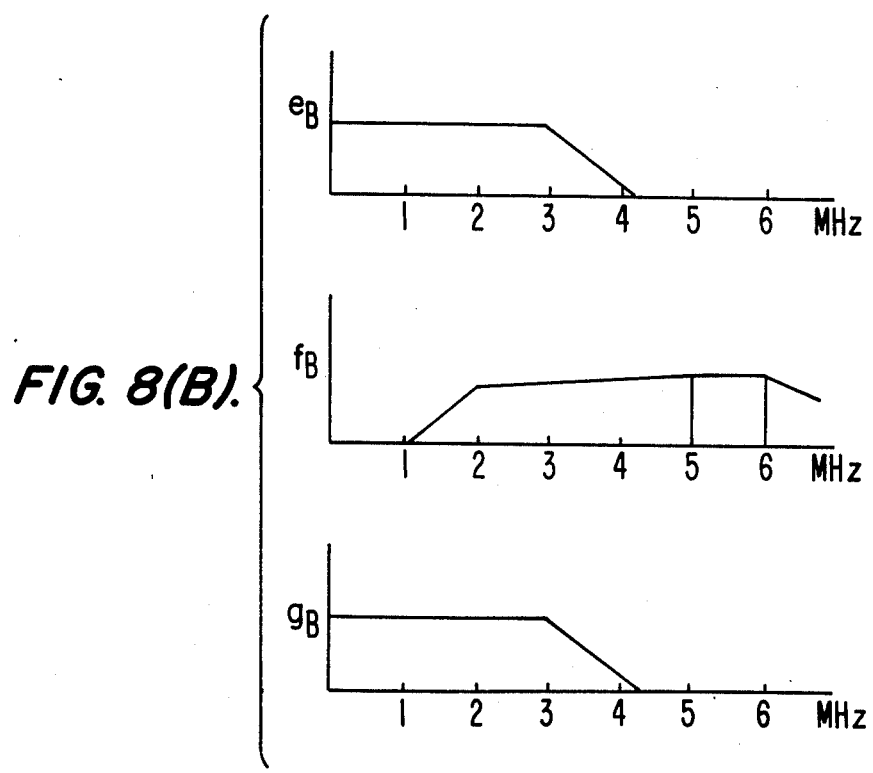
Figure 9:
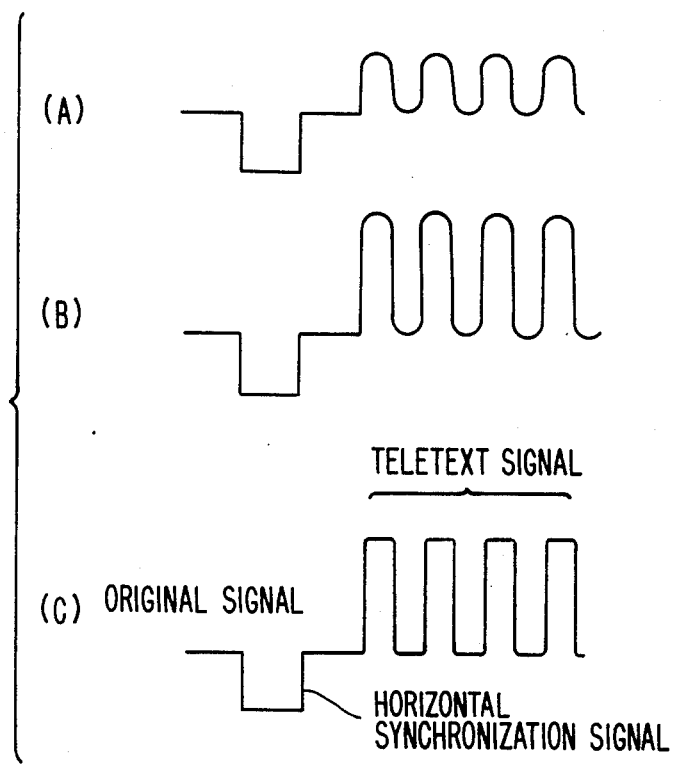

FIGS. 8(A)–(B) are schematic diagrams of the spectrum of signal waveforms. In this figure, $e_A$, $e_B$, $f_A$, $f_B$, $g_A$, $g_B$ respectively correspond to e, f, g of FIG. 3(A). FIG. 8(A) shows an example where the switch (3) is closed on the side of terminal (Ta), while FIG. 8(B) shows an example where the switch is closed on the side of terminal (Tb). The hatched area shows the influence of the comb filter. The reproduced waveforms of the teletext signal in FIGS. 8(A) and (B) are shown in FIGS. 9(A) and (B). In comparison with the original signal of FIG. 9(C), the teletext signal does not have an H correlation, namely it receives a large influence of the comb filter and therefore the reproduced waveform is largely attenuated in the circuit (A) passing the terminal (Ta) of switch (53) but is least attenuated in the circuit (B) passing the terminal (Tb) of switch (53). Namely, it is necessary for recording and playback of the teletext signal having no H correlation that the switch (53) of FIG. 7(A) is closed to the side of terminal (Tb) in the duration where the teletext signal is superposed.

Figure 5:
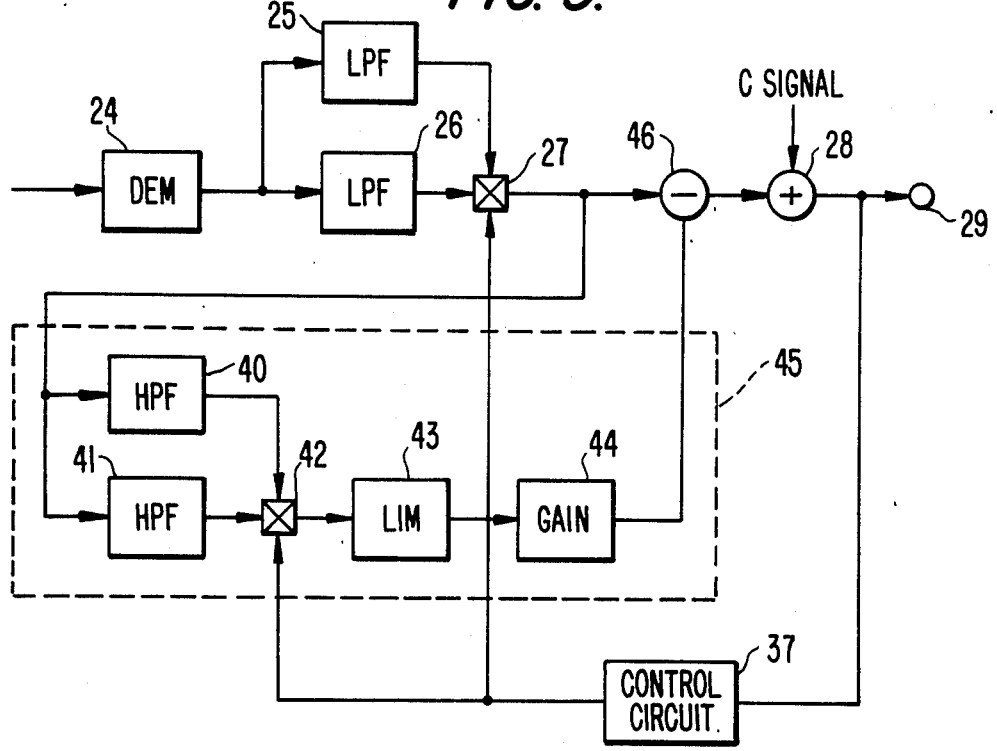
FIG. 5 is a block diagram indicating a part of a reproduction system of another embodiment of a magnetic recording and playback apparatus of the present invention.

As shown in FIGS. 4(a)–(e), the teletext signal is superposed on the arbitrary one or two scanning lines between the scanning number 10H to 21H in the vertical blanking period. Therefore, it is understood that the switch (53) is required to close to the side of terminal (Tb) for only the period including such a duration. Here, $a_1$ and $a_3$ of FIG. 5 are equivalent pulse periods, $a_2$ is vertical synchronization pulse period, $a_4$ is the teletext signal region, and $a_5$ is horizontal synchronization pulse. The above numerals indicate the scanning line numbers.

An example of control signal d is shown in FIG. 4(b). The signal (b) indicates that after the vertical synchronization pulse is detected, the switch is changed over for the period of 14H and when (b) is high level, the switch (53) is closed to the side of Tb.

However, the color bursts in this duration not attenuated by LPF (56) shown in FIG. 7(A) is not desirable because it is recorded and reproduced as the luminance signal and becomes a noise of reproduced color burst sent from the color signal system. Therefore, the control signal may become the high level in the duration except for the color burst duration. In this case, the control signal as shown in (C) is used. The signals (a), (c) in the period (i) are enlarged as (d), (e).

The switch (61) of FIG. 7(A) is used when it is not required to record the teletext signal and is not related to the present invention. For example, the control signal d is always low level by closing the switch (61) and the switch (53) closes to the side of terminal (Ta). The circuit thereby operates only as an ordinary VTR.

It is obvious that the characteristics of LPF (56) and HPF (58) shown in FIG. 7(A) assure the bandwidth of 2.86 MHz or more as the luminance signal.

Figure 10:
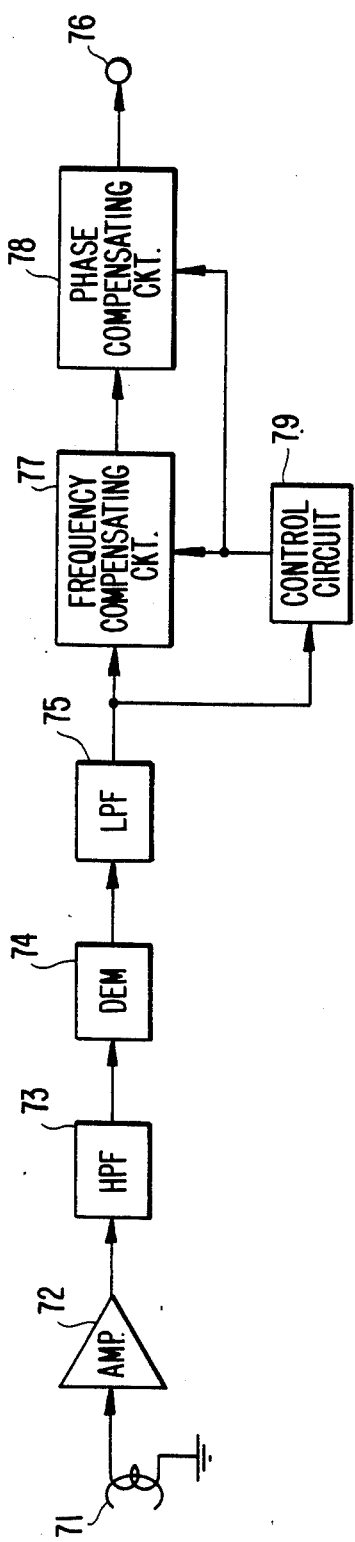
FIG. 10 is a block diagram of a playback system of another embodiment of a magnetic recording and playback apparatus of the present invention.

Another embodiment of the present invention will be explained by referring to the drawings. FIG. 10 shows a block diagram showing a further playback system of a VTR of the present invention.

Figure 11:
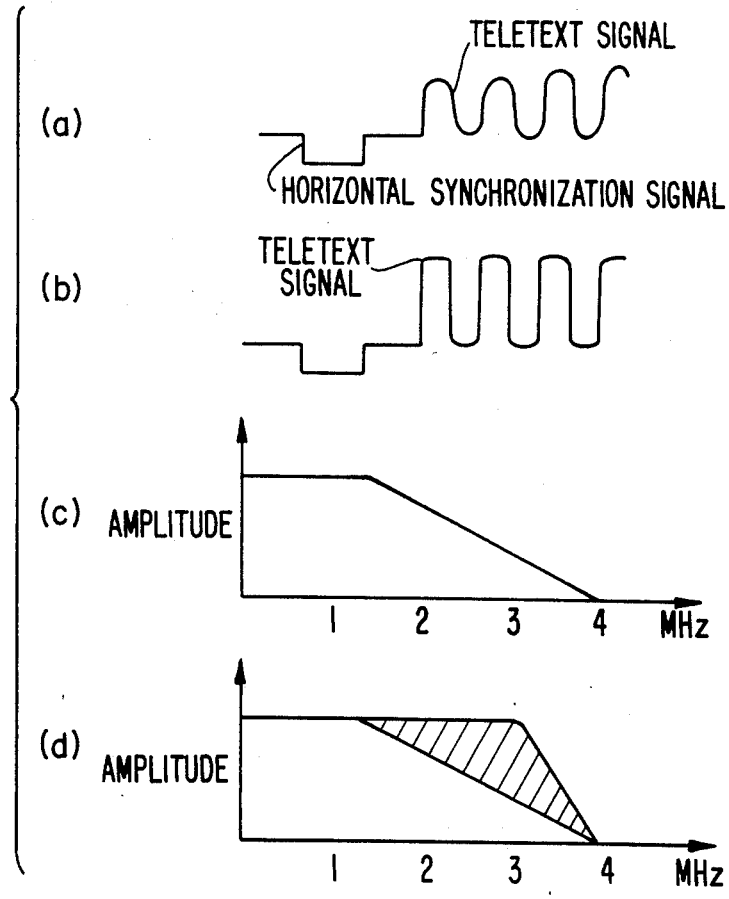

In FIG. 10, the signal reproduced by the playback head (71) passes the playback amplifier (72), HPF (73) and is demodulated by DEM (74). The signal then passes a frequency compensating circuit (77) and a phase compensating circuit (78) and is sent to the output terminal (76). Here, as shown in FIG. 11(c), the high frequency characteristic of the uncompensated playback signal of VTR is somewhat lowered and the waveform of the teletext signal is largely deformed as shown in FIG. 11(a). Therefore, in the period where the teletext signal exists, compensation is carried out in accordance with the control signal sent from the control circuit (79) in the frequency compensating circuit (77) and the phase compensating circuit (78). The frequency compensating circuit (77) improves the high frequency characteristic as shown in FIG. 11(d). The hatched area indicates the improved characteristic. The character signal is reproduced after considerable improvement in waveform as shown in FIG. 11(b). The phase compensating circuit (78) compensates for disturbance of phase generated when the signal is processed in the frequency characteristic compensating circuit (77) and this circuit may be omitted. Here, an output from the phase compensating circuit (78) shows deterioration of S/N because the high frequency range is enphasized but since the teletext signal is a digital signal, some deterioration of the S/N can be neglected.

Namely, as an ordinary video signal, an output of the LPF with a good S/N is directly outputted without any compensation, and as the reproduced signal of teletext signal, the compensated signal is output.

Here, as shown in FIGS. 4(a)–(e), the teletext signal b is superposed on arbitrary one or two scanning lines between the scanning lines 10H and 21H in the vertical blanking period and therefore it is understood to be enough to compensate the signal only for the period including such duration period.

Here, the control circuit (79) detects the vertical synchronization signal from the reproduced signal and thereby outputs the control signal for the specified period.

Various control signals other than that shown in FIGS. 4(a)–(e) can be thought but it is enough that such control signal is outputted during the period where the teletext signal exists. Therefore, it is thought that it is simplest way to use the vertical synchronous signal as the reference. Of course, covers the case where the present invention that the teletext signal is detected and the control signal is generated in accordance with such data.

The control circuit for generating such control signal can easily be realized by the well known technique. For example, in the simplest example, control is executed on the assumption that the teletext signal is superposed in all vertical blanking periods. In this case, an output pulse of a monostable multivibrator can be used as the control signal for switching the filter with such constitution that the monostable multivibrator which generates a pulse having the duration as long as the vertical blanking period is triggered by the output signal (vertical synchronization signal) of a well known vertical synchronization signal separation circuit which separates and extracts the vertical synchronization signal from the video signal.

Figure 13B:
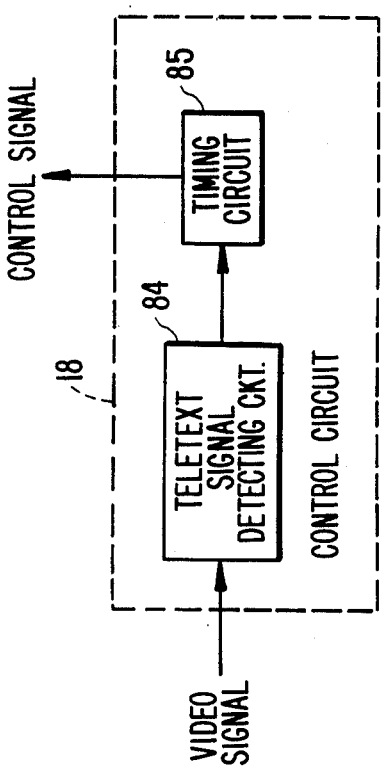
FIGS. 13(A) and (B) are block diagrams of the control circuit used respective embodiments of the present invention.
Figure 13A:
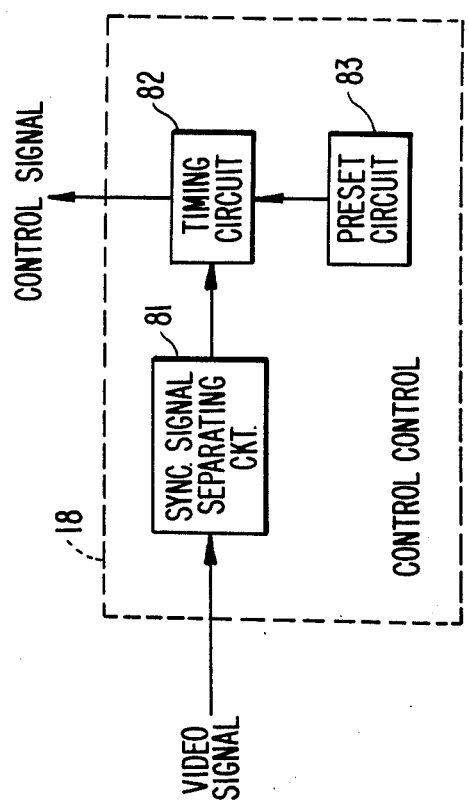
Figure 12A:
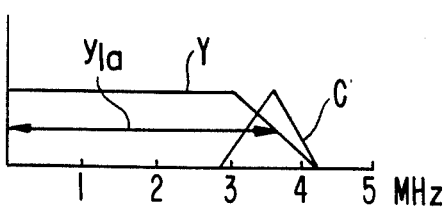
FIGS. 12(a)–(g) are frequency characteristics used for explaining the characteristics of a magnetic recording and playback apparatus of the prior art.
Figure 12B:
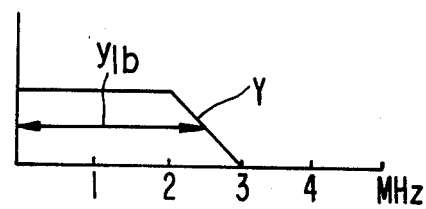
Figure 12C:
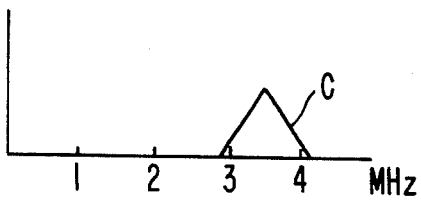
Figure 12D:
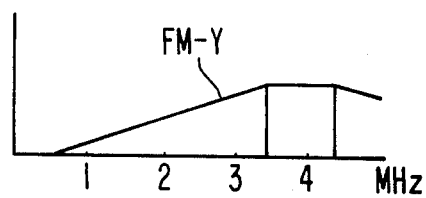
Figure 12E:
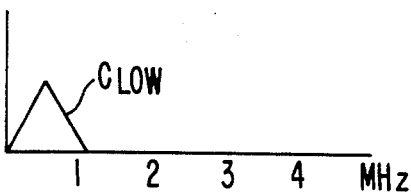
Figure 12F:
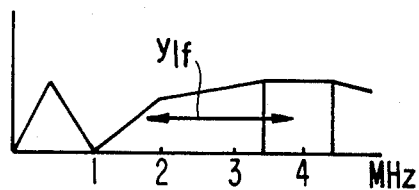
Figure 12G:
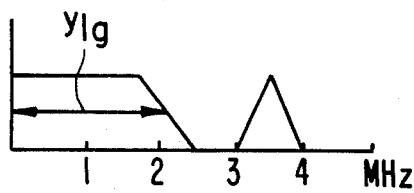

The control circuit which executes the filter switching control only in the vertical blanking period where the teletext signal is actually superposed can also be easily realized by the well known technique. In case it is specified that in which vertical blanking period of television signal the teletext signal is superposed, it is enough to form the circuit, for example, shown in FIG. 13(A). The preset circuit (83) is used to set the number of vertical blanking period where the teletext signal is superposed. The vertical synchronization signal separating circuit (81) separates and outputs the vertical synchronization signal from the input television signal. The timing circuit (82) counts the vertical synchronization signal outputted from the vertical synchronization signal separating circuit (81) and outputs the pulse signal having the pulse width equal to one vertical blanking period as the control signal for filter switching when the counted value coincides with the value set by the preset circuit (83). For example, such a timing circuit can easily be realized by a preset counter and a monostable multivibrator. In other cases, if it is not clear in which vertical blanking period the teletext signal is superposed, one must detect the vertical blanking period where the teletext signal is superposed. An example of the constitution of the control circuit in such a case is shown in FIG. 13(B). The teletext signal detecting circuit (84) detects the teletext signal from the input television signal and extracts an output signal for triggering the timing circuit (85). This circuit can be realized easily by the well known technique.

The control circuit is briefly explained above but various other constitutions may be made in addition to those mentioned above. At any rate, the control circuit can be realized easily by persons skilled in the art.

The magnetic recording and playback apparatus of the present invention has been explained by referring to some embodiments thereof and it is of course possible to modify in various ways such embodiments within the scope of the present invention.

What is claimed is:

1. A magnetic recording and playback apparatus for recording on and reproducing from a magnetic recording medium a video signal on which a teletext signal is superposed, comprising:
   a recording signal processing means for processing said video signal to obtain a recordable signal;
   a recording head for recording said recordable signal on said recording medium;
   a reproducing head for reproducing the recorded signal from said recording medium; and
   a reproduced signal processing means for processing the reproduced signal from said reproducing head to obtain a reproduced video signal which is equivalent to said video signal,
   said recording signal processing means comprising:
   a first low-pass filter for extracting a luminance signal from said video signal;
   a frequency modulator for frequency-modulating said luminance signal;
   a first high-pass filter for reducing noise components contained in the frequency-modulated luminance signal;
   a first band-pass filter for extracting a chrominance signal from said video signal;
   a first frequency converter for converting a frequency band of said chrominance signal to a low frequency band;
   a second low-pass filter for reducing noise components contained in the low-frequency-band chrominance signal;
   a first mixer for mixing output signals of said first high-pass and second low-pass filters to obtain said recordable signal; and
   a first control means for producing a first control signal which is indicative of a period in which said teletext signal is superposed on said video signal,
   said reproducing signal processing means comprising:
   a second high-pass filter for extracting a reproduced frequency-modulated luminance signal from said reproduced signal;
   a frequency demodulator for frequency-demodulating said reproduced frequency-modulated luminance signal to obtain a reproduced luminance signal;
   a third low-pass filter for reducing noise components contained in said reproduced luminance signal;
   a fourth low-pass filter for extracting a reproduced low-frequency-band chrominance signal from said reproduced signal;
   a second frequency converter for converting said low frequency band of said reproduced low-frequency-band chrominance signal to said frequency band of said chrominance signal to obtain a reproduced chrominance signal;

a second band-pass filter for reducing noise components contained in said reproduced chrominance signal;

a second mixer for mixing output signals of said third low-pass and second band-pass filters to obtain said reproduced video signal; and a second control means for producing a second control signal which is indicative of a period in which said teletext signal is superposed on said reproduced video signal, wherein at least one of said first low-pass and first high-pass filters is adapted to widen its frequency passband in response to said first control signal, and at least one of said second high-pass and third low-pass filters is adapted to widen its frequency passband in response to said second control signal, thereby passing said teletext signal, which has a wide frequency band.

2. An apparatus according to claim 1, wherein at least one of said first band-pass and second low-pass filters is adapted to reduce its frequency passband response to said first control signal.

3. An apparatus according to claim 1, wherein at least one of said fourth low-pass and second band-pass filters is adapted to reduce its frequency passband in response to said second control signal.

4. An apparatus according to claim 1, wherein at least one of said first low-pass and first high-pass filters comprises a first filter circuit, a second filter circuit having a frequency passband which is wider than that of said first filter circuit, and a switch which is adapted to normally select said first filter circuit and to be responsive to said first control signal for selecting said second filter circuit.

5. An apparatus according to claim 1, wherein at least one of said second high-pass and third low-pass filter comprises a first filter circuit, a second filter circuit having a frequency passband which is wider than that of said first filter circuit, and a switch which is adapted to normally select said first filter circuit and to be responsive to said second control signal for selecting said second filter circuit.

6. An apparatus according to claim 1, wherein at least one of said first band-pass and second low-pass filters comprises a first filter circuit, a second filter circuit having a frequency passband which is narrower than that of said first filter circuit, and a switch which is adapted to normally select said first filter circuit and to be responsive to said first control signal for selecting said second filter circuit.

7. An apparatus according to claim 1, wherein at least one of said fourth low-pass and second band-pass filters comprises a first filter circuit, a second filter circuit having a frequency passband which is narrower than that of said first filter circuit, and a switch which is adapted to normally select said first filter circuit and to be responsive to said second control signal for selecting said second filter circuit.

8. An apparatus according to claim 1, further comprising at least one of a frequency compensating circuit which compensates for a frequency characteristic of said reproduced luminance signal, and a phase compensating circuit which compensates for a phase characteristic of said reproduced luminance signal, wherein each of said frequency and phase compensating circuits is adapted to operate only in response to said second control signal.

9. An apparatus according to claim 1, wherein said first low-pass filter has a comb filter for eliminating said chrominance signal from said video signal, and a switch which is adapted to be responsive to said first control signal for directly passing said video signal without passing through said comb filter during said period in which said teletext signal is superposed on said video signal.

10. An apparatus according to claim 1, wherein each of said first and second control signals occurs within specified horizontal scanning periods including horizontal scanning periods in which said teletext signal exists after a vertical synchronization signal except for color burst periods.

* * * * *